United States Patent [19]
Klock et al.

[11] Patent Number: 6,153,108
[45] Date of Patent: Nov. 28, 2000

[54] METHOD FOR REMOVAL OF HEAVY METALS FROM WATER

[75] Inventors: Byron Von Klock, Beaumont; Rahul Subodh Patel, Sugar Land, both of Tex.

[73] Assignee: Texaco Inc., White Plains, N.Y.

[21] Appl. No.: 09/096,023

[22] Filed: Jun. 11, 1998

[51] Int. Cl.[7] .................................................. C02F 1/52
[52] U.S. Cl. .................. 210/722; 210/726; 210/912; 210/914
[58] Field of Search .................................. 210/722, 726, 210/912, 914

[56] References Cited

U.S. PATENT DOCUMENTS

| | | | |
|---|---|---|---|
| 3,658,697 | 4/1972 | Huether | 210/18 |
| 4,102,784 | 7/1978 | Schlauch | 210/47 |
| 4,211,646 | 7/1980 | Westbrook et al. | 210/15 |
| 4,422,943 | 12/1983 | Fender et al. | 210/716 |
| 4,705,639 | 11/1987 | Aldrich | 210/720 |
| 5,000,859 | 3/1991 | Suciu et al. | 210/713 |
| 5,298,168 | 3/1994 | Guess | 210/713 |
| 5,308,500 | 5/1994 | Schwarzbach | 210/716 |
| 5,380,443 | 1/1995 | Deininger et al. | 210/726 |
| 5,616,251 | 4/1997 | Bataresh | 210/725 |
| 5,618,417 | 4/1997 | Spindler | 210/722 |
| 5,685,993 | 11/1997 | Liu | 210/695 |

OTHER PUBLICATIONS

Reynolds, T.D., *Unit Operations And Processes In Enviromental Engineering*, pp. 23–28, (1982).

*Primary Examiner*—Ivars Cintins
*Attorney, Agent, or Firm*—Morris N. Reinisch; Howrey Simon Arnold & White

[57] ABSTRACT

A method to remove heavy metals concentrations in water down to very low levels is described. The method calls for the addition of a soluble sulfide to the water. This is followed adding a soluble iron reagent such as ferrous sulfate or ferrous chloride. The water is aerated. As an alternative to aeration, the pH of the water can be increased. Finally, the solids generated from the above steps are separated from the water. This method has been shown to remove heavy metals, particularly copper and zinc, from actual industrial wastewater to very low concentrations, i.e., below about 100 ppb. Furthermore, the treated water is free of sulfide. The byproduct sludge comprises iron sulfide, iron oxides, iron hydroxides, and the heavy metal sulfides.

21 Claims, No Drawings

METHOD FOR REMOVAL OF HEAVY METALS FROM WATER

FIELD OF THE INVENTION

The instant invention generally relates to removal of metals from water. In particular, the invention relates to the removal of heavy metals such as copper, zinc, cadmium, lead, nickel, and mercury from water and from wastewater.

BACKGROUND OF THE INVENTION

A long-standing problem in treatment of industrial and municipal waters and waste waters of various types is removal of toxic heavy metals such as copper, zinc, cadmium, lead, nickel, and mercury. Alkaline precipitation is sometimes employed to remove these metals from an aqueous stream, but it is often difficult to reduce the concentration of the metals as below about 10 parts per billion. Part of the removal difficulty may arise from the relatively high solubility of some of the hydroxides. The solubility of several metal hydroxides, as well as the solubility of calcium and iron hydroxide, is shown by their solubility product constants in Table 1. Solubility product constants are the product of the concentration of the ions of a substance in a solution, which is at equilibrium with an excess of that substance, with concentrations expressed as moles per liter.

TABLE 1

Solubilities of Metal Hydroxides

| Sulfide Compound | Formula | Solubility Product Constant, $K_{SP}$* | Metal Solubility from Hydroxide, ppb |
|---|---|---|---|
| Cadmium Hydroxide | Cd(OH)2 | $5.33 \times 10^{-15}$ | 8.4 |
| Lead Hydroxide | Pb(OH)2 | $1.40 \times 10^{-20}$ | 0.025 |
| Nickel Hydroxide | Ni(OH)2 | $5.54 \times 10^{-16}$ | 1.4 |
| Zinc Hydroxide | Zn(OH)2 | $7.68 \times 10^{-17}$ | 0.6 |
| Calcium Hydroxide | Ca(OH)2 | $7.88 \times 10^{-6}$ | 113000 |
| Iron Hydroxide | Fe(OH)2 | $4.79 \times 10^{-17}$ | 0.4 |

*CRC Handbook of Chemistry and Physics, 64th Edition, Page B–219

The solubility from the hydroxide is the amount of that heavy metal that would exist in water in equilibrium with the solid hydroxide compound, provided there were no other sources or sinks for the hydroxyl ion or for the heavy metal ion.

A second method of removing these heavy metals is via ion exchange. This method also has difficulty in removing heavy metal concentrations below about 10 parts per billion (ppb) on a commercial scale. Another difficulty is in the consumption of the removal medium, be it hydroxide ions or available ion exchange sites, by common but innocuous metals such as calcium, iron and the like. While this is easy to monitor and correct for in hydroxide precipitation, it is much more difficult for ion exchange processes.

One technique for thorough removal of heavy metals is precipitation with sulfide. Heavy metal sulfides form very stable and insoluble sulfides, as shown by their solubility product constants in Table 2. The potential for metal removal though the precipitation and collection of sulfides to levels far below the part per billion range is clearly evident.

TABLE 2

Solubilities of Metal Sulfides

| Sulfide Compound | Formula | Solubility Product Constant, $K_{SP}$* | Metal Solubility from Sulfide ppb |
|---|---|---|---|
| Cadmium Sulfide | CdS | $1.40 \times 10^{-29}$ | $4.2 \times 10^{-7}$ |
| Copper Sulfide | CuS | $1.27 \times 10^{-36}$ | $7.2 \times 10^{-11}$ |
| Lead Sulfide | PbS | $9.04 \times 10^{-29}$ | $2.0 \times 10^{-6}$ |
| Mercuric Sulfide | HgS | $6.44 \times 10^{-53}$ | $1.6 \times 10^{-18}$ |
| Nickel Sulfide | NiS | $1.07 \times 10^{-21}$ | $1.9 \times 10^{-3}$ |
| Zinc Sulfide | ZnS | $2.93 \times 10^{-25}$ | $3.5 \times 10^{-5}$ |

*CRC Handbook of Chemistry and Physics, 73rd Edition, Page 8–43

The principal hindrance to the use of sulfide as a precipitating agent is the fact that the sulfide ion itself is a noxious pollutant in water. It is highly toxic to aquatic life, and also exerts a high oxygen demand as measured by biochemical oxygen demand or chemical oxygen demand. Therefore, the water may well be more toxic after the addition of sulfide, even though many of the heavy metals may have been precipitated out of solution.

The use of ferrous ions to remove a noxious pollutant, cyanide, from cyanide-contaminated water was discussed in U.S. Pat. No. 4,211,646 to Westbrook et al. The Westbrook process involved adding ferrous ions to waters that were contaminated with cyanides, adding a base to increase the pH of the solution to between about 7 to 9, and separating out a sludge comprised of iron cyanide. This patent also discussed the coprecipitation of ferrous ions and nickel, vanadium, and chromium ions in the sludge.

SUMMARY OF THE INVENTION

As a means for overcoming these disadvantages, the method described in this invention was developed. In this method, a soluble sulfide such as sodium sulfide or potassium sulfide, or any other soluble sulfide or combination of soluble sulfides, is added to the water. The sulfide combines with the heavy metals. This is followed by adding a soluble iron-based salt such as ferrous sulfate or ferrous chloride. The iron ions combine with remaining sulfide to form insoluble iron sulfide. The water is then aerated. Aeration promotes the oxidation of ferrous ions to ferric ions, and the ferric ions in turn precipitate out as oxides and hydroxides. Finally, the solids generated from the above steps are separated from the water. This method has been shown to remove heavy metals, particularly copper and zinc, from actual industrial wastewater to very low concentrations, i.e., less than 100 parts per billion by weight (ppb), and preferably less than abouut 10 ppb. Furthermore, the resulting effluent is free of sulfide, containing less than 0.1 parts per million by weight (ppm) of free sulfide. The byproduct sludge comprises iron sulfide, iron oxide/hydroxide, and heavy metals in the form of precipitates, separated colloids, or even material that may otherwise be soluble but that coprecipitated with the remaining sludge.

If the pH of the water is very low, below about 3, then much of the iron that does not combine with the sulfide ions to form iron sulfide will not precipitate. The preferred pH for the water at this step is a pH of above about 4. However, satisfactory results are achieved at lower pH values so long as the presence of dissolved iron in the treated water does not present a problem.

As an alternative to adding the ferrous iron reagent, a ferric salt such as ferric sulfate can be added to the sulfiderich water. The ferric ion will only stay in solution if the pH of the water is low, i.e., below about pH 4. In this case, aeration may not be necessary to precipitate out the iron sludge. Altering the pH though the addition of a base, to a pH above about 4, will result in the precipitation of the iron without aeration.

DETAILED DESCRIPTION OF THE INVENTION

As used herein, the term heavy metals refers to a metal, not including halides, having an atomic number greater than about 50. Heavy metals that are typically encountered in waters include copper, zinc, cadmium, lead, nickel, chromium, silver and mercury.

As used herein, an iron-based reagent is a reagent comprised of iron in either the ferrous or the ferric form that can release ferrous ions or ferric ions into the aqueous solution. Typical iron-based reagents include ferrous sulfate, ferrous chloride, and ferric sulfate.

As used herein, a sulfide reagent is a compound that releases the sulfide ion into water, either directly through dissolution or disassociation, or indirectly through a reaction. Typical sulfide reagents are sodium sulfide, potassium sulfide, and hydrogen sulfide.

As used herein, the term heavy metal sulfide solids refers to precipitates, colloids, and soluble complexes insofar as these complexes comprise a heavy metal, and so long as these complexes are removed from the solution either alone or with the precipitation of iron sulfides, iron hydroxides, iron oxides, or mixtures thereof.

As used herein, the term dosage refers to the addition of a reagent, in either a solid, gas, or liquid form, in a quantity sufficient to achieve the desired concentration.

The first step in the method is adding a sulfide reagent in a soluble form to the water. The quantity of sulfide added must be in an amount sufficient to combine with those metals that are to be removed plus those metals that will precipitate when sulfide is present to effect a quantitative precipitation of heavy metal sulfides. The dosage of the sulfide must therefore be at least equimolar to the concentration of the metals being removed, but preferably should exceed this concentration to accelerate the reaction and effect more thorough removal. The molar ratio of sulfide to metals is preferably from about 50:1 to about 1000:1 for typical wastewater. This wide range and substantial excess of sulfide reduces the need to analyze the water to determine the exact dosage needed. The molar ratio of sulfide to metals can be increased beyond this range if it is known that there is a substantial sulfide scavenger, for example iron or barium, in the water. The molar ratio of sulfide to metals can also be increased beyond this range if the quantity of heavy metals originally present is so low that the dosage of sulfide is less than about 100 micro-moles per liter ($\mu m/L$).

The goal is to have an excess of sulfide after the sulfide has reacted to all species in the wastewater that it can react with, including heavy metals and sulfide scavengers. This eliminates the need to test the water and to re-treat the water if a sufficient quantity of sulfide was not added. In addition, trace metal sulfides may coprecipitate or be enmeshed in the ferrous or ferric sulfide that is subsequently precipitated.

The sulfide reagent can be any metal sulfide which is soluble in water; sodium sulfide and potassium sulfide may be preferred for economic reasons and because the counterions are innocuous. "Soluble in water" means that the reagent must be capable of providing a sufficient concentration of sulfide ions to the water. A sufficient quantity of sulfide ions is about 0.001 or higher moles of sulfide ions per liter of water. The sulfide reagent can be added as a solid, though the preferred method is to add an aqueous solution. Hydrogen sulfide can be used, though its toxicity may limit the utility of this sulfide reagent in many applications and environments and its solubility at moderate to low pH levels may not be adequate for metals precipitation.

The temperature for the method is not critical, and can range from about 0° C. to about 100° C. The water cannot be frozen. Extremely salty water can be treated at even cooler temperatures. Similarly, the water should not be boiling. If the treatment facility maintains the water under pressure, temperatures above 100 C. are feasible. As a rule, the higher the temperature the faster the precipitation reactions occur. If a large concentration of calcium is present in the water, it may be preferable to run the reaction at room temperature. If there are suspected heavy metal organic chelates or slightly soluble precipitates in the waste water, an elevated temperature will generally facilitate the decomposition of these chelates or precipitates and the subsequent precipitation of the previously complexed or combined metal as a heavy metal sulfide.

The pH of the waste water is not critical in most applications. In very acidic conditions, i.e., at pH values less than about 2, the danger of hydrogen sulfide gas off-gassing from the solution increases. In very basic conditions heavy metals may exist in the water as complexed or colloidal heavy metal hydroxides. Both are detrimental to the utility of the process. Neutral or slightly acidic conditions, with an initial pH from about 9 to about 3, are therefore preferred. The desired pH may vary with the metals and other materials in solution. The optimum pH may be that which minimizes the formation and stability of soluble complexes of heavy metals in solution. The pH of the water may also need to be adjusted upward if aeration is not employed so that excess iron can precipitate as hydroxides.

The sulfide reaction time can vary from 1 minute to several hours, and is preferably in the range of 10–30 minutes.

The next step is to add an iron reagent. The purpose of this iron reagent is twofold. First, it precipitates any free sulfide in solution, eliminating this toxic pollutant. Second, the precipitate which comprises iron sulfides, iron hydroxides, iron oxides, or a mixture thereof may help sweep colloidal and complexed heavy metals from solution. The amount of soluble ferrous ion is based on the amount of sulfide added and may vary greatly. Typically, on a molar ratio basis, the mole ratio of ferrous ion to sulfide ion should be between about 1:1 and about 10:1, and is preferably between about 1.5:1 and about 3:1.

The pH of the solution is not critical with respect to the formation of ferrous sulfide. At very high pH values the formation of ferrous hydroxide will compete with the formation of ferrous sulfide, and additional ferrous ions may be required to compensate for this consumption of ferrous ions.

The reaction time for the ferrous ion can range from 1 minute to several hours, and is preferably in the range of 1–5 minutes. The ferrous ion-sulfide ion reaction to form ferrous sulfide is rapid. Longer reaction times will often provide a precipitate that is easier to handle.

The type of ferrous ion reagent can be any ferrous compound which has the desired solubility in water. Preferred ferrous compounds are ferrous sulfate, ferrous chloride, or mixtures of the two. The preferred method of adding the ferrous salt is through the addition of an aqueous ferrous solution.

In certain situations it may be desirable to maintain an inert atmosphere over the waste water. Dissolved oxygen promotes the oxidation of the ferrous ion to the ferric ion, and the ferric ion very quickly forms insoluble oxides and hydroxides.

While not wishing to be bound to any particular theory, it is believed that simple heavy metal sulfide precipitation is not the only active mechanism to remove metals. Precipitating the ferrous or ferric ion, by itself, is not a metals removing agent, yet it is able to effect significant removal of heavy metals from sulfide-precipitated water. A possible reason is that the ferrous or ferric ion acts as a coagulant to destabilize colloids and promote aggregation of these fine suspended solids into a filterable solid. The metals that are precipitated by the sulfide are present in very low concentrations. The salts formed are extremely insoluble. These factors both promote the formation of very fine, stable colloids. The ferric ion forms hydroxy-metallic complexes that tend to polymerize and to be adsorbed onto colloid particles. The high charge density of the complex destabilizes the electrostatic forces that keep the colloid particles from aggregating, so that particles aggregate and grow to the point where they can be separated from the water more effectively. Another possible mechanism is that there may be enmeshment of colloid particles and heavy metal complexes as the iron sulfide and iron hydroxides and iron oxides form a sludge precipitate. Ferrous salts, and in particular ferrous sulfate, require some alkalinity to form these hydroxides. A pH of 9 or above is preferred once the iron sulfide has had a chance to precipitate to promote the coagulation efficiency of excess ferrous ions.

Aeration has the effect of promoting the conversion of excess ferrous ions to ferric ions, which will precipitate as ferric hydroxide, thus removing the iron from solution. Aeration may aid in stripping any residual free sulfide from the solution. Aeration means adding dissolved oxygen to the water by any means. The preferred means is contacting the water with air, though any molecular oxygen containing or molecular oxygen generating material is acceptable.

The aeration time will vary depending on the amount of residual sulfide and the type of aeration employed. Typically, the method of aeration will preferably insure good gas to liquid mass transfer and substantial agitation of the water. Typical aeration methods include spargers that release small bubbles below the surface of the liquid, and sprayers that spray liquid into the air. The preferred method of aeration is with spargers; however, any method of aerating the water is satisfactory.

When such a preferred method is employed then the aeration time can range from 5 minutes to several hours; the preferred range is 20 minutes to 60 minutes. The air flow can range from about 0.01 to about 1 volumes of gas per volume of water per minute, and more preferably between about 0.1 to about 0.5 volumes of gas per volume of water per minute. The air flow is not critical. The range is selected because it facilitates good transfer of oxygen to the water as well as agitation of the water. Lower air flow rates can be compensated for by extending the aeration time and by agitating the water by some other means to insure adequate mixing.

The method can be employed without aeration if the iron reagent is a soluble ferric salt. However, the ferric ion has a strong tendency to form insoluble hydroxides, and this reaction will compete with the sulfide for the ferric ions. It is therefore preferred to have the water be acidic, with a pH below about 7, when the ferric ion is added to the water. After the ferric ion reacts with the available sulfide ions, the excess ferric ions can be precipitated by increasing the pH of the water. No aeration is needed.

Final sludge removal can be effected by any means such that the solids are separated from the water. Typically, a combination of settling and filtration is employed due to the ease of operation. Any conventional means of settling in continuous or batch settling or clarification processes can be used. Recycling sludge to facilitate settling may be appropriate in some cases. Filtration can be done by granular media (sand) filters or by cartridge filters. As is known in the art, coagulating agents or other chemicals can be used to facilitate solids removal by settling and filtration. Solids removal should advantageously remove substantially all of the settled and suspended solids, since these solids contain the metals being removed.

The method can be used for removal of any heavy metals which form highly insoluble sulfides, including, but not limited to, cadmium, copper, lead, mercury, nickel, and zinc. The wastewater being treated can arise from any source, including, but not limited to, petroleum industry wastewater, metal plating industry wastewater, chemical industry wastewater, and municipal wastewater. This method can also be used to remove heavy metals from municipal, well, or surface water where very low concentrations of these heavy metals are desired.

EXAMPLE ONE

A sample of biologically treated gasoline tank bottoms wastewater was treated by adding sodium sulfide to give a concentration of 1.5 g/L as $Na_2S.9H_2O$ (6800 $\mu$m S/L). The molar ratio of added sulfide to heavy metals was about 480 to 1. The mixture was stirred for 15 minutes, and ferrous sulfate was added to give a concentration of 2.6 g/l (9400 $\mu$m/L) as $FeSO_4.7H_2O$. The molar ratio of added ferrous ions to added sulfide ions was about 1.4 to 1. This was followed by 30 minutes of aeration with compressed air. The sample was then filtered through a 0.5 $\mu$m cartridge filter, and the treated water was analyzed. The copper level in the treated water was reduced from 790 $\mu$g/L (12.4 $\mu$m/L) to 20 $\mu$g/L, a removal of 97 percent. The zinc level was reduced from 113 $\mu$g/L (1.73 $\mu$m/L) to 14 $\mu$g/L, a removal of 88 percent. The equilibrium concentration of the copper and the zinc, from the solubility product constants, should both be below 1 $\mu$g/L. The residual heavy metals may have been in the form of a colloid not removed by the filter or in the form of soluble complexes.

EXAMPLE TWO

Sodium sulfide was added to a biologically treated diesel fuel tank bottoms wastewater to give a concentration of 1.5 g/L (6800 $\mu$m/L) as $Na_2S.9H_2O$. The molar ratio of added sulfide to heavy metals was about 370 to 1. The mixture was stirred for 15 minutes, and ferrous sulfate was added to give a concentration of 2.6 g/L (9400 $\mu$m/L) as $FeSO_4.7H_2O$. The molar ratio of added ferrous ions to added sulfide ions was about 1.4 to 1. This was followed by 30 minutes of aeration with compressed air. The sample was then filtered through a 0.5 $\mu$m cartridge filter, and analyzed. The copper level in the treated water was reduced from 980 $\mu$g/L (15.4 $\mu$m/L) to 50 $\mu$g/L, a removal of 95 percent. The zinc level was reduced from 195 $\mu$g/L (3.0 $\mu$m/L) to 16 $\mu$g/L, a removal of 92 percent. The removal efficiency was again clearly below the theoretical level.

EXAMPLE THREE

Sodium sulfide was added to a biologically treated gasoline tank bottoms wastewater to give a concentration of 0.769 g/L (3470 μm/L) as $Na_2S \cdot 9H_2O$. The molar ratio of added sulfide to heavy metals was about 100 to 1. The solution was then filtered through a 0.45 μm filter. The copper level in the treated water was reduced from 2100 μg/L (33 μm/L) to 710 μg/L, a removal of 66 percent. The zinc level was reduced from 73 μg/L (1.1 μm/L) to 50 μg/L, a removal of only 32 percent.

Ferrous ion was added to the partially treated water to provide a concentration of 1.33 μg/L (4780 μm/L) as $FeSO_4 \cdot 7H_2O$. The molar ratio of added ferrous ions to added sulfide ions was about 1.4 to 1. The mixture was aerated, and filtered. The copper concentration in the treated water declined to 140 μg/L, a removal of 93 percent. The zinc concentration declined to 24 μg/L, a removal of 67 percent.

Comparison of the final copper and zinc concentrations in the above examples with the solubility values in Table 2 indicates that a significant fraction of the copper and zinc must still be in a chemical form (e.g., chelated or complexed) not susceptible to sulfide precipitation, or in a colloidal form not susceptible to filtration. The results in the third example show that simple sulfide precipitation is not the only active mechanism in this procedure, since ferrous ion and air are able to effect significant removal of metals from sulfide-precipitated water.

What is claimed is:

1. A method for removal of heavy metals from waste water, comprising:
   (a) adding an amount of sulfide reagent in a soluble form to the waste water, wherein the quantity of sulfide reagent added is such that the molar ratio of sulfide to metals is between about 50:1 to about 1000:1, and allowing the formation of heavy metal sulfide solids to proceed;
   (b) adding an amount of an iron reagent in soluble form to the waste water, thereby forming iron sulfide solids, wherein the amount of iron reagent is at least equal to the amount of sulfide added to the waste water;
   (c) precipitating excess iron ions from solution; and
   (d) separating the solids from the water.

2. The method in claim 1 wherein the water comprises heavy metals selected from the group consisting of cadmium, copper, lead, mercury, nickel, zinc, and mixtures thereof.

3. The method in claim 1 wherein the sulfide reagent comprises sodium sulfide, potassium sulfide, or a combination thereof.

4. The method in claim 1 wherein the sulfide reagent comprises hydrogen sulfide.

5. The method in claim 1 wherein the sulfide reagent added in step (a) comprises sodium sulfide, potassium sulfide, hydrogen sulfide or a combination thereof, and wherein the sulfide is allowed to react from about 10 minutes to about 30 minutes.

6. The method in claim 5 in which the iron reagent comprises ferrous sulfate, ferrous chloride, or a combination thereof.

7. The method in claim 5 in which the quantity of iron reagent added is such that the mole ratio of iron reagent to sulfide reagent is between about 1:1 to about 10:1.

8. The method in claim 5 in which the quantity of iron reagent added is such that the mole ratio of iron reagent to sulfide reagent is between about 1.5:1 to about 3:1.

9. The method in claim 1 in which the iron reagent comprises ferrous sulfate, ferrous chloride, or a combination thereof.

10. The method in claim 1 in which the quantity of iron reagent added is such that the mole ratio of iron reagent to sulfide reagent is between about 1:1 to about 10:1.

11. The method in claim 1 in which the quantity of iron reagent added is such that the mole ratio of iron reagent to sulfide reagent is between about 1.5:1 to about 3:1.

12. The method of claim 1 wherein the precipitation of excess iron ions from solution is accomplished by aeration.

13. The method of claim 12 wherein the aeration time ranges from about 20 minutes to about 60 minutes.

14. The method of claim 12 wherein aerating comprises bubbling air through the water at a rate of between 0.01 to 1 volume of gas per volume of water per minute.

15. The method of claim 12 wherein aerating comprises bubbling air through the water at a rate of between 0.1 to about 0.5 volume of gas per volume of water per minute.

16. The method in claim 1 in which the iron reagent comprises ferric sulfate, ferric chloride, or a combination thereof.

17. The method of claim 16 wherein the precipitation of excess iron ions from solution is accomplished by adding a base to increase the pH of the solution.

18. The method of claim 1 wherein the precipitation of excess iron ions from solution is accomplished by adding a base to increase the pH of the solution.

19. The method of claim 1 wherein the waste water is petroleum industry wastewater.

20. The method of claim 1 wherein the waste water comprises chemical industry wastewater.

21. The method of claim 1 wherein the waste water comprises soluble organic complexes of heavy metals.

* * * * *